(12) United States Patent
Yang et al.

(10) Patent No.: US 10,992,354 B2
(45) Date of Patent: Apr. 27, 2021

(54) DIFFERENTIAL QUANTIZATION OF PRECODER MATRIX

(71) Applicant: MediaTek Singapore Pte. Ltd., Solaris (SG)

(72) Inventors: Weidong Yang, San Jose, CA (US);
Tzu-Han Chou, San Jose, CA (US);
Chou Kuan Hung, Hsinchu (TW);
Chao-Cheng Su, Hsinchu (TW);
Lung-Sheng Tsai, Hsinchu (TW)

(73) Assignee: MEDIATEK SINGAPORE PTE. LTD., Solaris (SG)

( * ) Notice: Subject to any disclaimer, the term of this patent is extended or adjusted under 35 U.S.C. 154(b) by 0 days.

(21) Appl. No.: 16/743,310

(22) Filed: Jan. 15, 2020

(65) Prior Publication Data

US 2020/0235792 A1    Jul. 23, 2020

Related U.S. Application Data

(60) Provisional application No. 62/793,434, filed on Jan. 17, 2019, provisional application No. 62/809,776, filed on Feb. 25, 2019.

(51) Int. Cl.
*H04B 7/0456* (2017.01)
*H04B 7/08* (2006.01)

(52) U.S. Cl.
CPC ......... *H04B 7/0456* (2013.01); *H04B 7/0828* (2013.01)

(58) Field of Classification Search
CPC ... H04B 7/0417; H04B 7/0452; H04B 7/0695
(Continued)

(56) References Cited

U.S. PATENT DOCUMENTS

2013/0072243 A1*  3/2013  Yu ..................... H04B 7/088
                                          455/509
2014/0177744 A1*  6/2014  Krishnamurthy .... H04B 7/0469
                                          375/267
(Continued)

FOREIGN PATENT DOCUMENTS

CN     107888323 A    4/2018
CN     109075849 A    12/2018

OTHER PUBLICATIONS

International Search Report, dated Mar. 30, 2020.
(Continued)

*Primary Examiner* — Ted M Wang
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be a UE. The UE measures one or more reference signals to determine a channel state on a channel including M delay taps. The UE determines a first precoder matrix for selecting a set of beams from L beams transmitted from the base station on the channel. The UE determines a second precoder matrix for combining the set of beams. The second precoder matrix includes at least two groups of coefficients each including coefficients being normalized based on a respective reference coefficient. Each coefficient corresponds to a respective one beam of the L beams at a particular polarization on a respective one delay tap of the M delay taps. The UE quantizes coefficients of the second precoder. The UE transmits an indication of the second precoder matrix having quantized coefficients.

20 Claims, 12 Drawing Sheets

(58) Field of Classification Search
USPC .......................................................... 375/267
See application file for complete search history.

(56) References Cited

U.S. PATENT DOCUMENTS

| | | | |
|---|---|---|---|
| 2016/0173176 A1* | 6/2016 | Mizusawa | H04W 16/28 375/267 |
| 2018/0145737 A1 | 5/2018 | Rahman et al. | |
| 2018/0262253 A1 | 9/2018 | Rahman et al. | |

OTHER PUBLICATIONS

Taiwan Patent Office, "Office Action", dated Dec. 18, 2020, Taiwan.
3GPP TSG RAN WG1 Meeting #95, R1-1812634, Spokane, USA, Nov. 12-16, 2018.
3GPP TSG-RAN WG1 Meeting #95, R1-1812806, Spokane, USA, Nov. 12-16, 2018.

* cited by examiner

DIFFERENTIAL QUANTIZATION OF PRECODER MATRIX

CROSS-REFERENCE TO RELATED APPLICATION(S)

This application claims the benefits of U.S. Provisional Application Ser. No. 62/793,434, entitled "CONSTELLATION DESIGN FOR TYPE II ENHANCEMENT" and filed on Jan. 17, 2019; U.S. Provisional Application Ser. No. 62/809,776, entitled "DIFFERENTIAL QUANTIZATION" and filed on Feb. 25, 2019; all of which are expressly incorporated by reference herein in their entirety.

BACKGROUND

Field

The present disclosure relates generally to communication systems, and more particularly, to techniques of performing differential quantization of precoder matrix at user equipment (UE).

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE measures one or more reference signals to determine a channel state on a channel including M delay taps. The UE determines a first precoder matrix for selecting a set of beams from L beams transmitted from the base station on the channel. The UE determines a second precoder matrix for combining the set of beams. The second precoder matrix includes at least two groups of coefficients each including coefficients being normalized based on a respective reference coefficient. Each coefficient corresponds to a respective one beam of the L beams at a particular polarization on a respective one delay tap of the M delay taps. The UE quantizes coefficients of the second precoder. The UE transmits an indication of the second precoder matrix having quantized coefficients.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
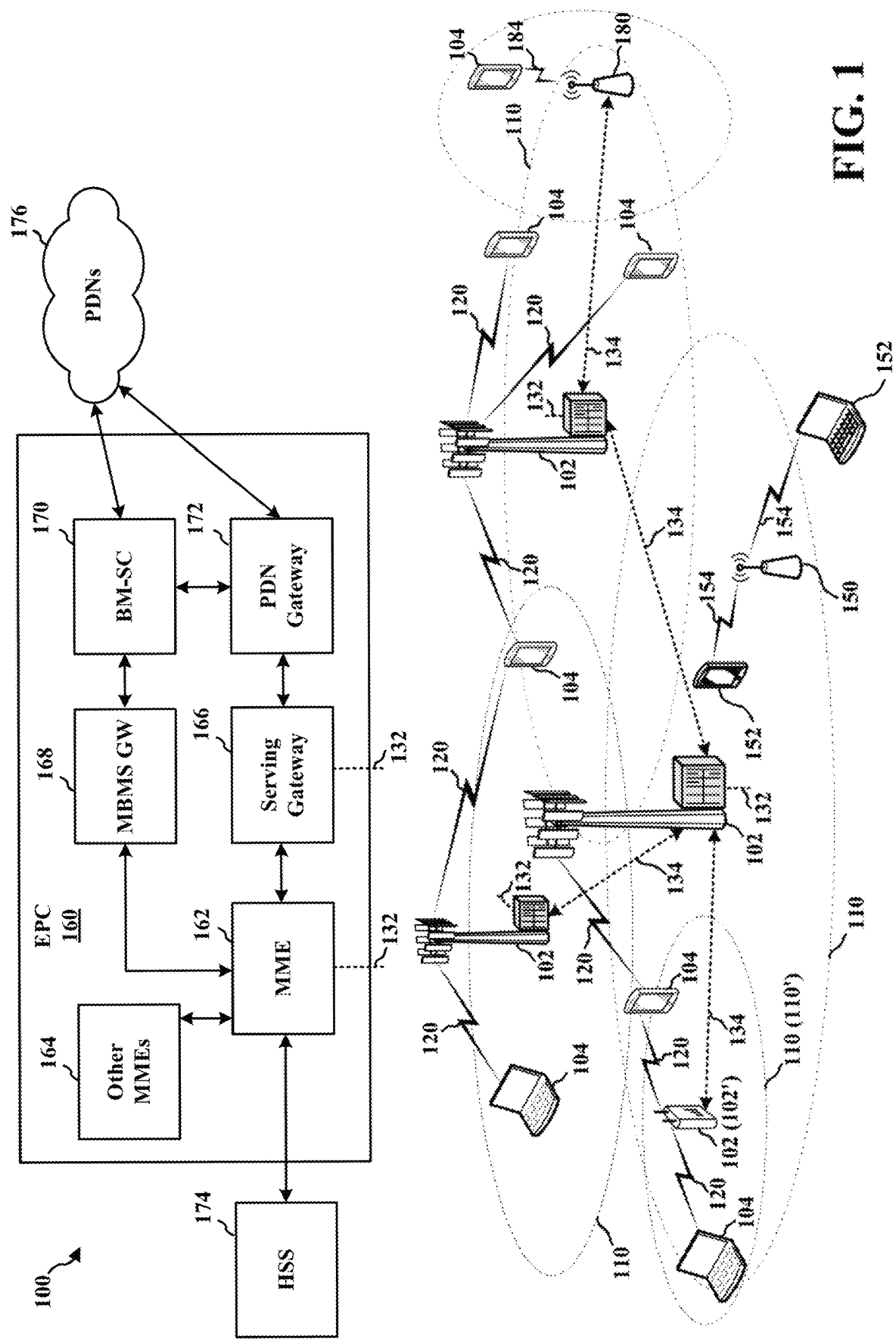
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and a core network 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the core network 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the core network 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The core network 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the core network 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the core network 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
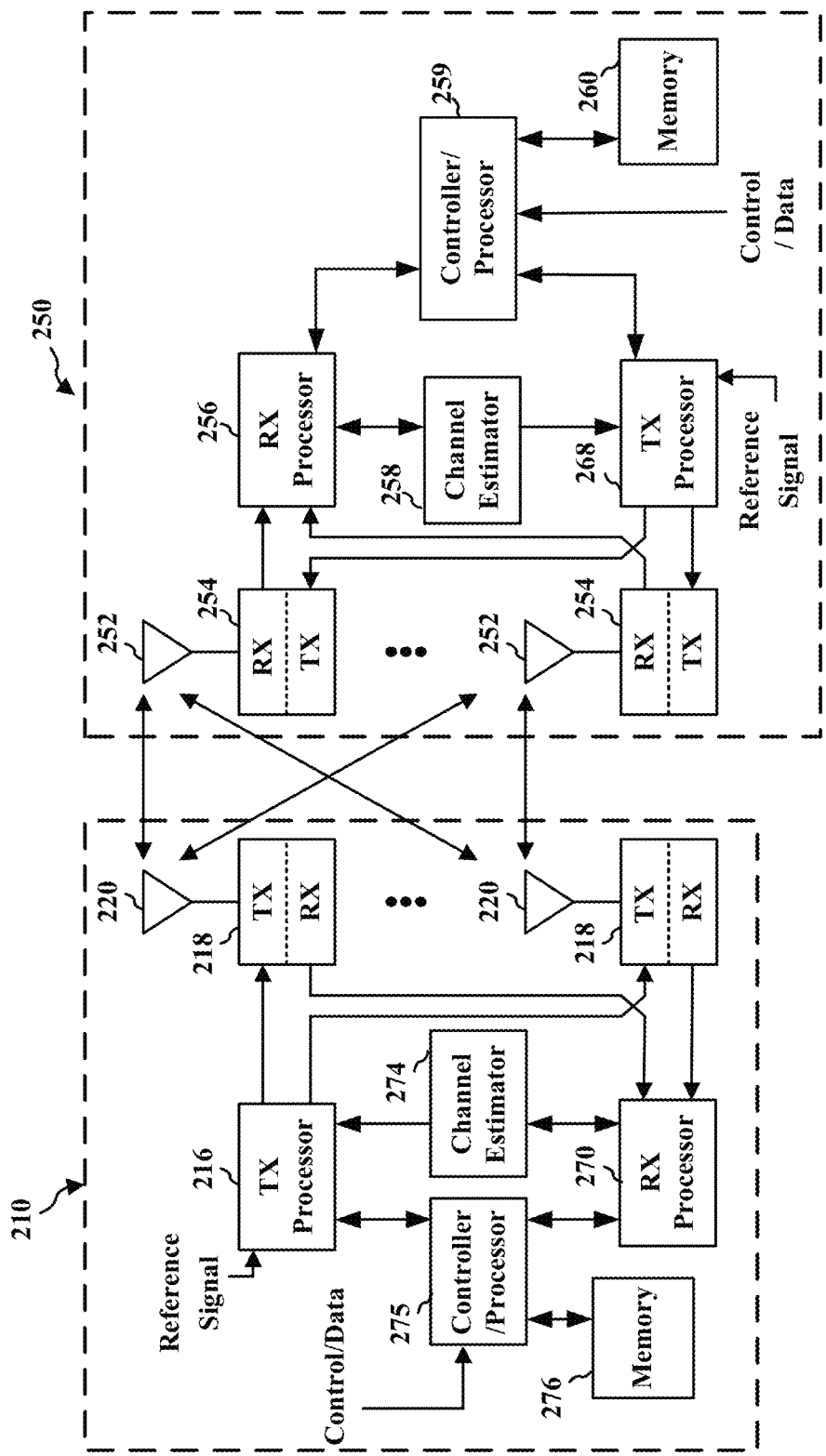
FIG. 2 is a diagram illustrating a base station in communication with a UE in an access network.

FIG. 2 is a block diagram of a base station 210 in communication with a UE 250 in an access network. In the DL, IP packets from the core network 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the core network 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the core network 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHZ may be supported. In one example, NR resource blocks (RBs) may span 12 sub-carriers with a sub-carrier bandwidth of 60 kHz over a 0.125 ms duration or a bandwidth of 15 kHz over a 0.5 ms duration. Each radio frame may consist of 20 or 80 subframes (or NR slots) with a length of 10 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
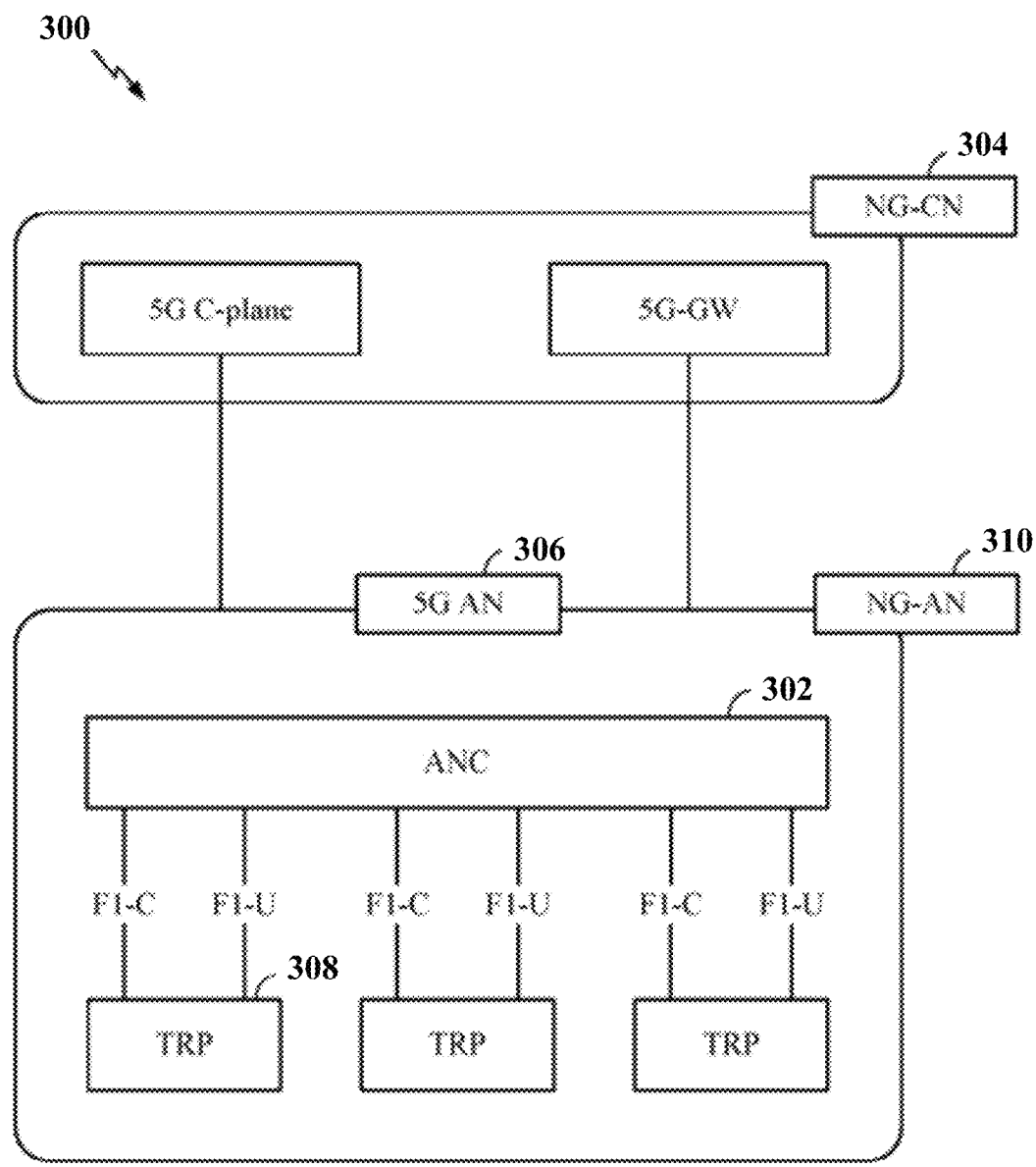
FIG. 3 illustrates an example logical architecture of a distributed access network.

FIG. 3 illustrates an example logical architecture 300 of a distributed RAN, according to aspects of the present disclosure. A 5G access node 306 may include an access node controller (ANC) 302. The ANC may be a central unit (CU) of the distributed RAN 300. The backhaul interface to the next generation core network (NG-CN) 304 may terminate at the ANC. The backhaul interface to neighboring next generation access nodes (NG-ANs) may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
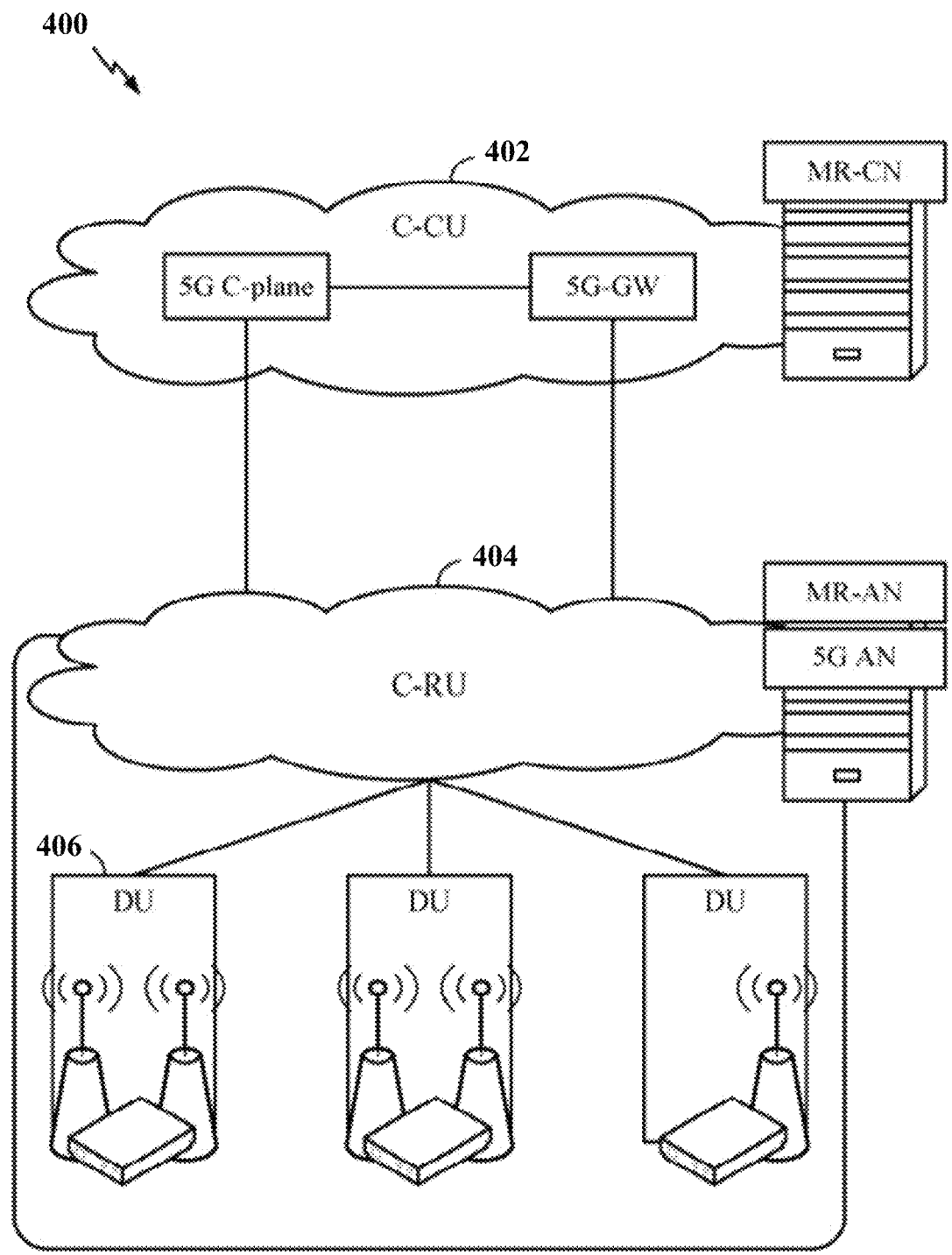
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
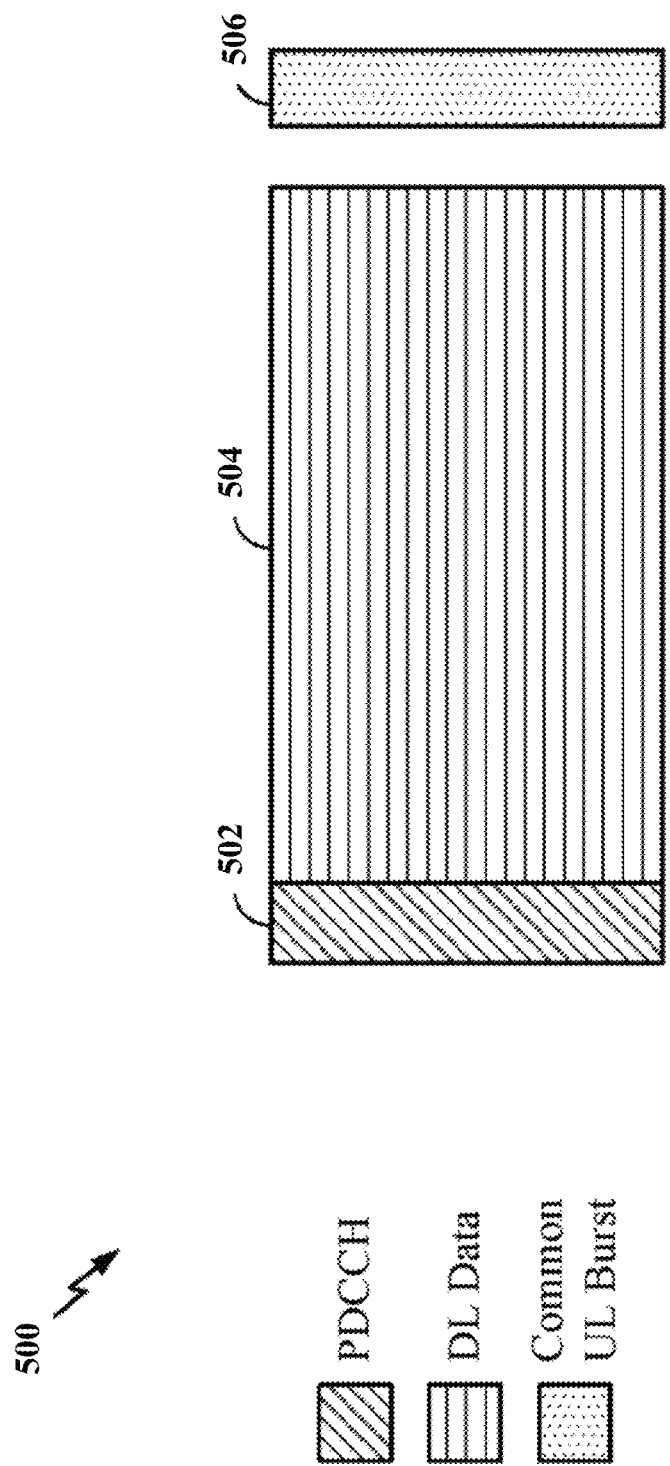
FIG. 5 is a diagram showing an example of a DL-centric subframe.

FIG. 5 is a diagram 500 showing an example of a DL-centric subframe. The DL-centric subframe may include a control portion 502. The control portion 502 may exist in the initial or beginning portion of the DL-centric subframe. The control portion 502 may include various scheduling information and/or control information corresponding to various portions of the DL-centric subframe. In some configurations, the control portion 502 may be a physical DL control channel (PDCCH), as indicated in FIG. 5. The DL-centric subframe may also include a DL data portion 504. The DL data portion 504 may sometimes be referred to as the payload of the DL-centric subframe. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric subframe may also include a common UL portion 506. The common UL portion 506 may sometimes be referred to as an UL burst, a common UL burst, and/or various other suitable terms. The common UL portion 506 may include feedback information corresponding to various other portions of the DL-centric subframe. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 6:
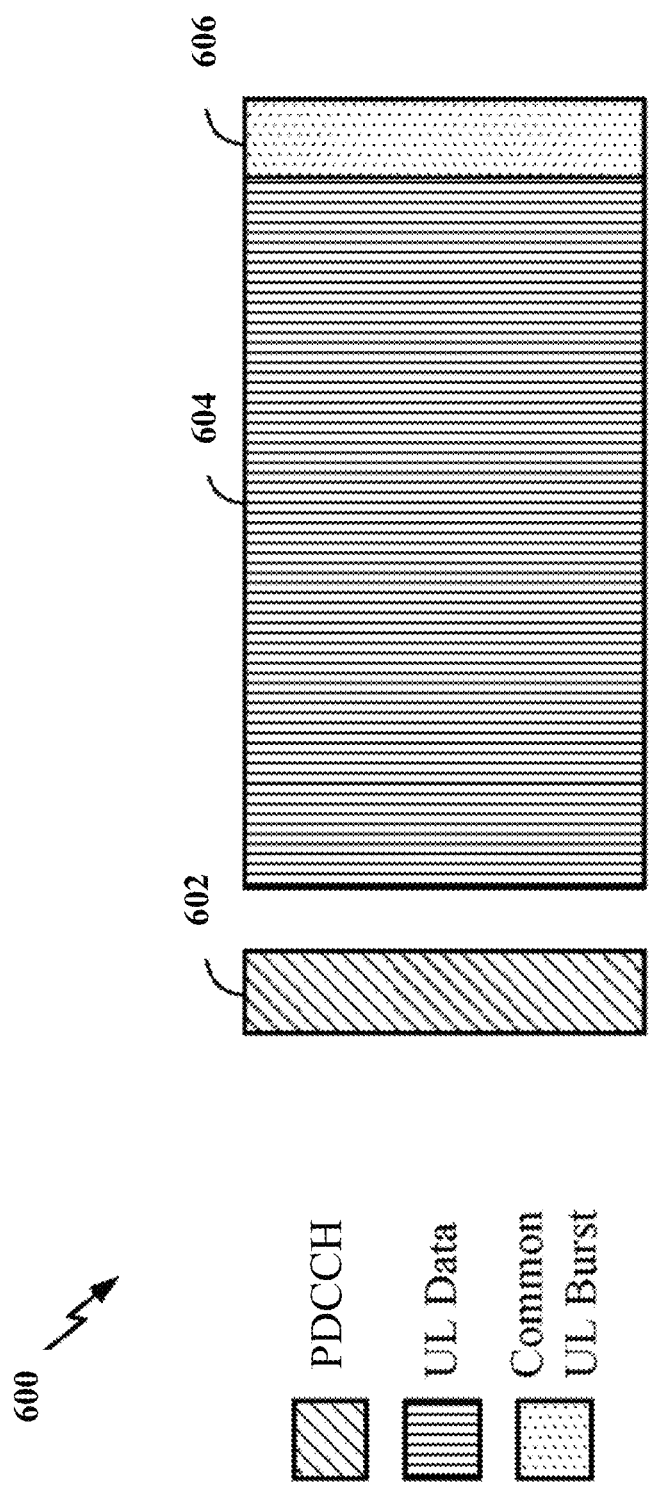
FIG. 6 is a diagram showing an example of an UL-centric subframe.

FIG. 6 is a diagram 600 showing an example of an UL-centric subframe. The UL-centric subframe may include a control portion 602. The control portion 602 may exist in the initial or beginning portion of the UL-centric subframe. The control portion 602 in FIG. 6 may be similar to the control portion 502 described above with reference to FIG. 5. The UL-centric subframe may also include an UL data portion 604. The UL data portion 604 may sometimes be referred to as the pay load of the UL-centric subframe. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 606. The common UL portion 606 in FIG. 6 may be similar to the common UL portion 606 described above with reference to FIG. 6. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such side link communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 7:
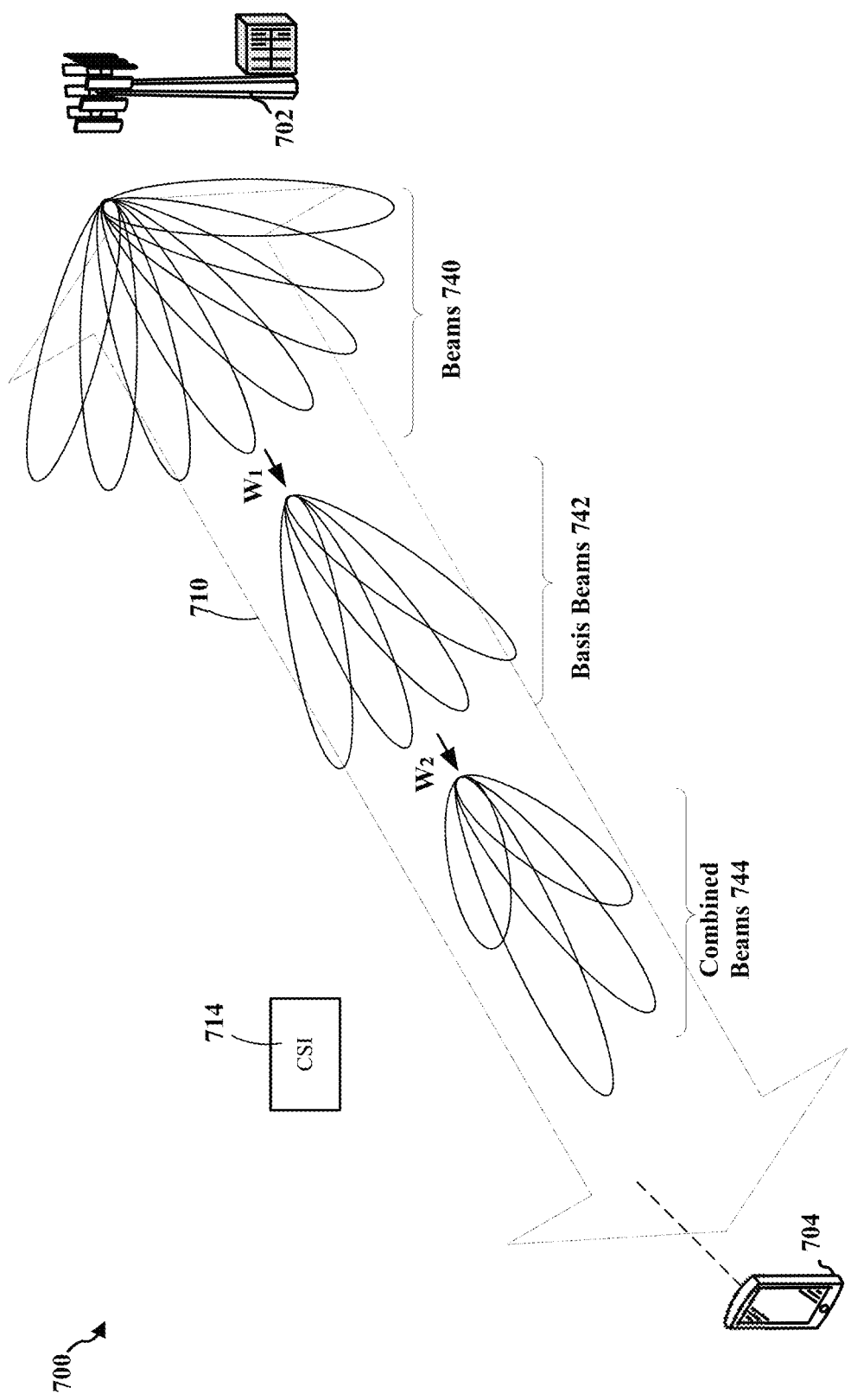
FIG. 7 is a diagram illustrating communications between a base station and UE.

FIG. 7 is a diagram 700 illustrating communications between a base station 702 and a UE 704 on a channel 710. Further, the base station 702 may transmit spatial beams 740 on the channel 710. Channel properties of the channel 710 (i.e., a wireless communication link) is referred to as channel state information 714. This information describes how a signal propagates from the transmitter at the base station 702 to the receiver at the UE 704 and represents the combined effect of scattering, multipath fading, signal power attenuation with distance, etc. The knowledge of the channel state information 714 at the transmitter and/or the receiver makes it possible to adapt data transmission to current channel conditions, which is crucial for achieving reliable and robust communication with high data rates in multi-antenna systems. The channel state information 714 is often required to be estimated at the receiver, and usually quantized and fed back to the transmitter.

The time and frequency resources that can be used by the UE 704 to report the channel state information 714 are controlled by the base station 702. The channel state information 714 may include CQI, PMI, CSI-RS resource indicator (CRI), SS block resource indicator, layer indication (LI), rank indicator (RI), and/or and L1-RSRP measurements. For CQI, PMI, CRI, LI, RI, L1-RSRP, the UE 704 may be configured via RRC signaling with more than one CSI-reportConfig reporting settings, CSI-ResourceConfig resource settings, and one or two lists of trigger states, indicating the resource set IDs for channel and optionally for interference measurement. Each trigger state contains an associated CSI-ReportConfig.

The NR supports two types of spatial-resolution CSI: standard-resolution (Type I) and high-resolution (Type II). The low-resolution CSI is targeted for SU-MIMO transmission since it relies on the UE receiver to suppress the inter-layer interference. This is possible since the number of received layers is less than the number of receiver antennas for a given UE. For MU-MIMO trans-mission, the number of received layers is typically larger than the number of receive antennas for the UE. The base station exploits beamforming/precoding to suppress inter-UE interference. Thus, a higher resolution CSI, capturing more propagation paths of the channel, is needed to provide sufficient degrees of freedom at the transmitter.

The UE 704 measures the spatial channel between itself and the serving base station using the CSI-RS transmitted from the base station 702 transmit antenna ports in order to generate a CSI report. The UE 704 then calculates the CSI-related metrics and reports the CSI to the base station 702. Using the reported CSIs from all UEs, the base station 702 performs link adaptation and scheduling. The goal of CSI measurement and reporting is to obtain an approximation of the CSI. This can be achieved when the reported PMI accurately represents the dominant channel eigenvector(s), thereby enabling accurate beamforming.

For high-spatial-resolution (Type II) CSI, feedback of two layers may be supported with a linear combination codebook. The codebook resolution is sufficiently high to facilitate sufficiently accurate approximation of the downlink channel. In this scheme, the UE reports a PMI that represents a linear combination of multiple beams. Type II CSI may employ a dual-stage $W=W_1 W_2$ codebook, where $W_1$ is a wideband precoder and $W_2$ is a subband precoder.

For Type II CSI, the $W_1$ matrix selects a subset of the spatial beams 740 that serves as basis beams 742 for linear combination performed by $W_2$. This subset selection may be common across two polarizations and may be for two transmission layers. The linear combination is performed per subband as well as independently across polarizations and layers to obtain combined beams 744.

In certain configurations, to reduce the feedback overhead for W2, some partial information pertaining to linear combination such as the strongest of the 2L linear combination coefficients and 2L-1 wideband reference amplitudes for subband differential encoding of the linear combination coefficients in $W_2$ is also included in $W_1$. Therefore, the amplitude component of the linear combination coefficients may include wideband and subband components. The phase component may be per subband and configurable as QPSK or 8-PSK.

In certain configurations, the channel 710 between the base station 702 and the UE 704 has a rank R. The frequencies of the channel 710 can be divided into a number of sub-bands or frequency units. The frequency units can be indexed from 1 to $F_{total}$. The precoder W for rank r and frequency unit indexed f can be written as $$W_{r,f} = \begin{bmatrix} B & \\ & B \end{bmatrix} \underbrace{\begin{bmatrix} \tilde{w}_{0,r,f} \\ \vdots \\ \tilde{w}_{l,r,f} \\ \vdots \\ \tilde{w}_{L-1,r,f} \\ \tilde{w}_{L,r,f} \\ \vdots \\ \tilde{w}_{l+L,r,f} \\ \vdots \\ \tilde{w}_{2L-1,r,f} \end{bmatrix}}_{w^{(2)}_{r,f}}$$

where $B=[b_1 \ldots b_l \ldots b_L]$. L is the number of basis beams 742 per polarization; each $b_i$ is a spatial beam selected in a wideband fashion per polarization, where $1 \leq i \leq L$. In total, 2L spatial beams are selected for two polarization. r is the spatial layer index, $1 \leq r \leq R$; f is a frequency index (e.g., the subband index or PRB index), $1 \leq f \leq F_{total}$, where $F_{total}$ is the total number of frequency units (sub-bands, PRBs etc.) over which the CSI feedback is applicable, e.g., 16 or 19.

The precoders for spatial layer r for all frequency indices $1=f=N_3$ in a segment can be written as:

$$[W_{r,1} \ldots W_{r,F}] = \begin{bmatrix} B & \\ & B \end{bmatrix} [w^{(2)}_{r,0} \ldots w^{(2)}_{r,N_3-1}]$$

$$= \begin{bmatrix} B & \\ & B \end{bmatrix} \begin{bmatrix} \tilde{w}_{0,r,0} & \cdots & \tilde{w}_{0,r,N_3-1} \\ \vdots & \cdots & \vdots \\ \tilde{w}_{l,r,0} & \cdots & \tilde{w}_{l,r,N_3-1} \\ \vdots & \cdots & \vdots \\ \tilde{w}_{L-1,r,0} & \cdots & \tilde{w}_{L-1,r,N_3-1} \\ \tilde{w}_{L,r,0} & \cdots & \tilde{w}_{L,r,N_3-1} \\ \vdots & \cdots & \vdots \\ \tilde{w}_{l+L,r,0} & \cdots & \tilde{w}_{l+L,r,N_3-1} \\ \vdots & \cdots & \vdots \\ \tilde{w}_{2L-1,r,0} & \cdots & \tilde{w}_{2L-1,r,N_3-1} \end{bmatrix}$$

$$= \begin{bmatrix} B & \\ & B \end{bmatrix} \underbrace{\begin{bmatrix} w_{0,r,0} & \cdots & w_{0,r,N_3-1} \\ \vdots & \cdots & \vdots \\ w_{l,r,0} & \cdots & w_{l,r,N_3-1} \\ \vdots & \cdots & \vdots \\ w_{L-1,r,0} & \cdots & w_{L-1,r,N_3-1} \\ w_{L,r,0} & \cdots & w_{L,r,N_3-1} \\ \vdots & \cdots & \vdots \\ w_{l+L,r,0} & \cdots & w_{l+L,r,N_3-1} \\ \vdots & \cdots & \vdots \\ w_{2L-1,r,0} & \cdots & w_{2L-1,r,N_3-1} \end{bmatrix}}_{w_2} \begin{bmatrix} f_0^H \\ \vdots \\ f_{N_3-1}^H \end{bmatrix}$$

$$\approx \begin{bmatrix} B & \\ & B \end{bmatrix} \underbrace{\begin{bmatrix} w_{0,r,\bar{k}_0} & \cdots & w_{0,r,\bar{k}_{M-1}} \\ \vdots & \cdots & \vdots \\ w_{l,r,\bar{k}_0} & \cdots & w_{l,r,\bar{k}_{M-1}} \\ \vdots & \cdots & \vdots \\ w_{L-1,r,\bar{k}_0} & \cdots & w_{L-1,r,\bar{k}_{M-1}} \\ w_{L,r,\bar{k}_0} & \cdots & w_{L,r,\bar{k}_{M-1}} \\ \vdots & \cdots & \vdots \\ w_{l+L,r,\bar{k}_0} & \cdots & w_{l+L,r,\bar{k}_{M-1}} \\ \vdots & \cdots & \vdots \\ w_{2L-1,r,\bar{k}_0} & \cdots & w_{2L-1,r,\bar{k}_{M-1}} \end{bmatrix}}_{\tilde{w}_2} \begin{bmatrix} f_{\bar{k}_0}^H \\ \vdots \\ f_{\bar{k}_{M-1}}^H \end{bmatrix}$$

-continued and $$f_d = \begin{bmatrix} e^{j \cdot 2\pi \frac{m_d \cdot 0 \cdot O_3 + o_3}{N_3 O_3}} \\ e^{j \cdot 2\pi \frac{m_d \cdot 1 \cdot O_3 + o_3}{N_3 O_3}} \\ \vdots \\ e^{j \cdot 2\pi \frac{m_d \cdot (N_3-1) \cdot O_3 + o_3}{N_3 O_3}} \end{bmatrix}$$

where $N_3$ is the number of sub-bands (or frequency bins) for CSI feedback or equally the maximum number of delay taps in the time domain formulation, and $O_3$ is an oversampling factor. And M delay taps (or FD components) are used in the approximation; and $O_3$'s role is best understood in the time domain formulation as it provides a finer timing unit for delay taps through $o_3$, $0 \leq o_3 \leq O_{3-1}$.

At spatial layer r, initially the coefficient with the largest amplitude in $\tilde{W}_2$ is identified. In this example, $w_{i,r,m}$ is the coefficient. The amplitude of $w_{i,r,m}$ is used to normalize $\tilde{W}_2$:

$$\tilde{W}_2 \leftarrow \frac{1}{w_{i,r,m}} \tilde{W}_2$$

In one configuration, the normalized matrix $\tilde{W}_2$ is partitioned into two parts:

$$\tilde{W}_2 = \begin{bmatrix} G_0 \\ G_1 \end{bmatrix}$$

The first part contains the first L rows, i.e., rows 0, . . . L−1; the second part contains the second L rows, i.e. rows L+1, . . . 2L. Let the coefficients in $G_p$ be denoted as $g_{i,m,p}$, $0 \leq p \leq 1$, $0 \leq i \leq L-1$, $0 \leq m \leq M-1$.

For $G_0$ (i.e., p=0), the coefficient with the largest amplitude is identified as $g_{i^a,m^a,p}$. Accordingly, $g_{i^a,m^a,p}$ is quantized with a first quantizer with A bits for amplitude and $C_1$ bits for phase:

$$g_{i^a,m^a,p} \approx A_{i^a,m^a,p} e^{j\phi_{i^a,m^a,p}},$$

where $A_{i^a,m^a,p}$ is the quantized amplitude and $\phi_{i^a,m^a,p}$ is the quantized phase with a first quantizer.

For $(i, m) \neq (i^a, m^a)$; $0 \leq i \leq L-1$, $0 \leq m \leq M-1$; then the normalized coefficient $g_{i,m,p}/A_{i^a,m^a,p}$ is quantized with a second quantizer with B bits for amplitude and $C_2$ bits for phase:

$$g_{i,m,p}/A_{i^a,m^a,p} = A_{i,m,p} e^{j\phi_{i,m,p}}$$

$A_{i,m,p}$ is the quantized amplitude and $\phi_{i,m,p}$ is the quantized phase with the second quantizer. Further, $$g_{i^a,m^a,p} \approx A_{i^a,m^a,p} e^{j\phi_{i^a,m^a,p}}$$

$$g_{i,m,p} \approx A_{i^a,m^a,p} \cdot A_{i,m,p} e^{j\phi_{i,m,p}}$$

for $(i, m) \neq (i^a, m^a)$, $0 \leq i \leq L-1$, $0 \leq m \leq M-1$, p=0.

Similarly, for $G_1$ (i.e., p=1), the coefficient with the largest amplitude is identified as $g_{i^b,m^b,p}$. Accordingly, $g_{i^b,m^b,p}$ is quantized with a first quantizer with A bits for amplitude and $C_1$ bits for phase:

$$g_{i^b,m^b,p} \approx A_{i^b,m^b,p} e^{j\phi_{i^a,m^a,p}}$$

Subsequently, the same procedure as that for $G_0$ can be applied. Note $g_{i^a,m^a,0}$ or $g_{i^b,m^b,1}$ is 1 by the normalization step $$\tilde{W}_2 \leftarrow \frac{1}{w_{i,r,m}} \tilde{W}_2.$$

As such, a representation of the amplitude is sufficient.

The proposed scheme would bring benefit if the dynamic range of coefficients in $G_1$ is very different from the dynamic range of the coefficients in $G_0$, so separate normalization through $A_{i^a,m^a,0}$ or $A_{i^b,m^b,1}$ would be beneficial.

As $G_0$ is for the gNB Tx antenna ports at one polarization; and $G_1$ is for gNB Tx antenna ports at another polarization; due to depolarization and the utilization of cross polarized antennas at gNB and/or UE, $A_{i^a,m^a,0}$ and $A_{i^b,m^b,1}$ may be close. Consequently, the benefit of performing polarization specific normalization and differential quantization may not be significant.

In a second configuration, the selected M delay taps in $\tilde{W}_2$ can be divided into two or more groups. In this example, the selected M delay taps are divided into two groups. Let the selected delay taps be indexed as 0, 1, . . . , M−1.

In a first technique, the first group contains delay taps 0, . . .

$$, \frac{M}{2} - 1.$$

The second group contains delay taps M/2, . . . , M−1. If M/2 is not an integer, then M/2 can be either rounded up or rounded up.

In a second technique, the strongest delay tap and its adjacent delay taps tend to have strong coefficients. Accordingly, the strongest delay tap, which can be determined as the delay tap where the strongest coefficient resides, and an interval around strongest delay tap it can be for group one, and the rest delay taps are for group one.

Let the strongest delay tap's index be s. In one approach, delay tap s is the first delay tap in group one. Accordingly, the delay taps in group one may be configured to have indices of $$\{\mathrm{mod}(x,M) | x = s, s+1, \ldots, s+M/2-1\},$$

In another approach, the delay tap s sits in the middle of group one. Accordingly, the delay taps in group one may be configured to have indices of $$\left\{\mathrm{mod}(x, M) | x = s - \frac{M}{4} + 1, s+1, \ldots, s + \frac{M}{4}\right\};$$

or the delay taps in group one may be configured to have indices of $$\{\mod(x, M) \mid x = s - \frac{M}{4} + 1, s + 1, \ldots, s + \frac{M}{4} - 1\}.$$

In yet another approach, considering the delay tap that precedes the delay tap s may experience leakage from a strong lap at s, the delay taps in group one may be configured to have indices of $$\{\mod(x, M) \mid x = s-1, s, s+1, \ldots, s+M/2-2\}.$$

Other techniques of partitioning may also be employed the base station 702 and the UE 704. For example, unequal sizes for group one and group two can also be considered.

In yet another technique, M delay taps can be partitioned directly so the first half delay taps are for group one, the second half delay taps are for group two. Note in this case, due to delay tap selection, the size of each group can be different.

Further, the number of delay tap groups can be also extended to more than two. With any of the proposed approach, for example, with two delay tap groups, and grouping also for polarizations, the normalized matrix $\tilde{W}_2$ is partitioned into four submatrices:

$$\tilde{W}_2 = \begin{bmatrix} G_{0,1} & G_{0,2} \\ G_{1,1} & G_{1,2} \end{bmatrix},$$

where $G_{p,j}$ is for polarization p, $0 \leq p \leq 1$, and FD group j, $1 \leq j \leq 2$. Similar to the techniques described supra, for each submatrix, the largest coefficient is selected and quantized with a first quantizer (high resolution quantizer). The quantized amplitude is used to normalize the rest coefficients. The normalized coefficients are quantized with a second quantizer (normal resolution quantizer). As such, the largest coefficient is quantized with a first quantizer, and the rest coefficients are quantized as the product of the largest coefficient's quantized amplitude and the quantized value including amplitude and phase from the second quantizer with the normalized coefficient. Further, in the example, among the four largest coefficients from four submatrices, one of them is 1.

It is also possible to pursue the partition of $\tilde{W}_2$ solely in the delay tap domain. That is, $\tilde{W}_2$'s columns are partitioned in submatrices, so polarization common and delay tap group specific normalization can be used. Similarly, the largest coefficient can be identified and two quantizers can be used to quantize $\tilde{W}_2$.

Furthermore, the indication of the selected coefficients can be through a combinatorial index. If the positions of all 4 coefficients are indicated, as each coefficient is selected from $$L \times \frac{M}{2}$$

submatrix, 4×log 2(n_choose_k (L×M/2,1)) bits are needed;

If the position of the largest coefficient among all L×M coefficient is separately signaled with other coefficients', then log 2(n_choose_k(2L×M, 1)) bits for the largest coefficient; and ceil(3×log 2(n_choose_k(L×M/2,1))) bits for other three coefficients.

In another aspect, the techniques described infra can be uses to quantize $\tilde{W}_2$. In this example, P amplitude levels exist for certain constellations in a quantizer: $A_p$, $0 \leq p \leq P-1$.

At amplitude level p, let there be $N_p$ phase angles; in another word there are $N_p$ constellations on amplitude level p. The constellations on amplitude level p are given by $$A_p e^{j\left(\frac{2\pi}{N_p}k + \phi_p\right)}, \; 0 \leq k \leq N_p - 1,$$

where $\phi_p$ is the phase rotation of constellations at amplitude level p (or constellation rotation at amplitude level p).

Denote the difference between constellation rotations at two adjacent amplitude levels by $$\Delta\phi_p = \phi_p - \phi_{p-1}, \; 1 \leq p \leq P-1,$$

where $\phi_0 = 0$.

In one configuration, the below requirement is to be satisfied $$\Delta\phi_p = \frac{2\pi}{2 \cdot N_{p-1}}, \; 1 \leq p \leq P - 1.$$

The constellations are arranged from adjacent amplitude levels in an interlaced fashion. The below equation is obtained:

$$\phi_p = \sum_{q=1}^{q=p} \Delta\phi_q = \sum_{q=1}^{q=p} \frac{2\pi}{2 \cdot N_{q-1}} = \sum_{q=1}^{q=p} \frac{\pi}{N_{q-1}}, \; 1 \leq p \leq P - 1.$$

As no difference is induced for the whole constellation set at an amplitude level p if the constellation rotation is a multiple of $2\pi/N_p$, equivalently the below equation can be obtained.

$$\phi_p = \mod\left(\sum_{q=1}^{q=p} \frac{\pi}{N_{q-1}}, 2\pi/N_p\right).$$

In this example, there are P amplitude levels, using 1.5 dB as power step. Accordingly, $$A_p = 2^{-p/4}, \; p=0, 1, \ldots, P-1, \text{ or}$$

$$A_p = 2^{-p/4}, \; p=0, 1, \ldots, P-2$$

In another example, there are P amplitude levels, using 3 dB as power step. Accordingly, $$A_p = 2^{-p/4}, \; p=0, 1, \ldots, P-1, \text{ or}$$

$$A_p = 2^{-p/4}, \; p=0, 1, \ldots, P-2$$

At amplitude level p, let there be $N_p$ phase angles;

$N_p = 16$ or $N_p = 8$ or $N_p = 4$, $p=0, \ldots, P-2$ or $p = 0, \ldots, P-1$.

The constellations on amplitude level p are given by $$A_p e^{j\left(\frac{2\pi}{N_p}k + \phi_p\right)}, \; 0 \leq k \leq N_p - 1, \text{ and}$$

$$\phi_p = \mod\left(\sum_{q=1}^{q=p} \frac{\pi}{N_{q-1}}, 2\pi/N_p\right) = \mod(p, 2) \times \pi/N_p.$$

In the case constellation rotation is not used, then $\phi_p = 0$.

More specifically, for a high resolution quantizer, $P=16$, $N_0=N_1= \ldots =16$ without constellation rotation can be used and the power step is 1.5 dB; 0 may or may not be included in as a quantization constellation.

For a normal resolution quantizer, $P=8$, $N_0=N_1= \ldots =8$ with constellation rotation can be used and the power step is 3 dB; 0 may or may not be included in as a quantization constellation.

Figure 8:
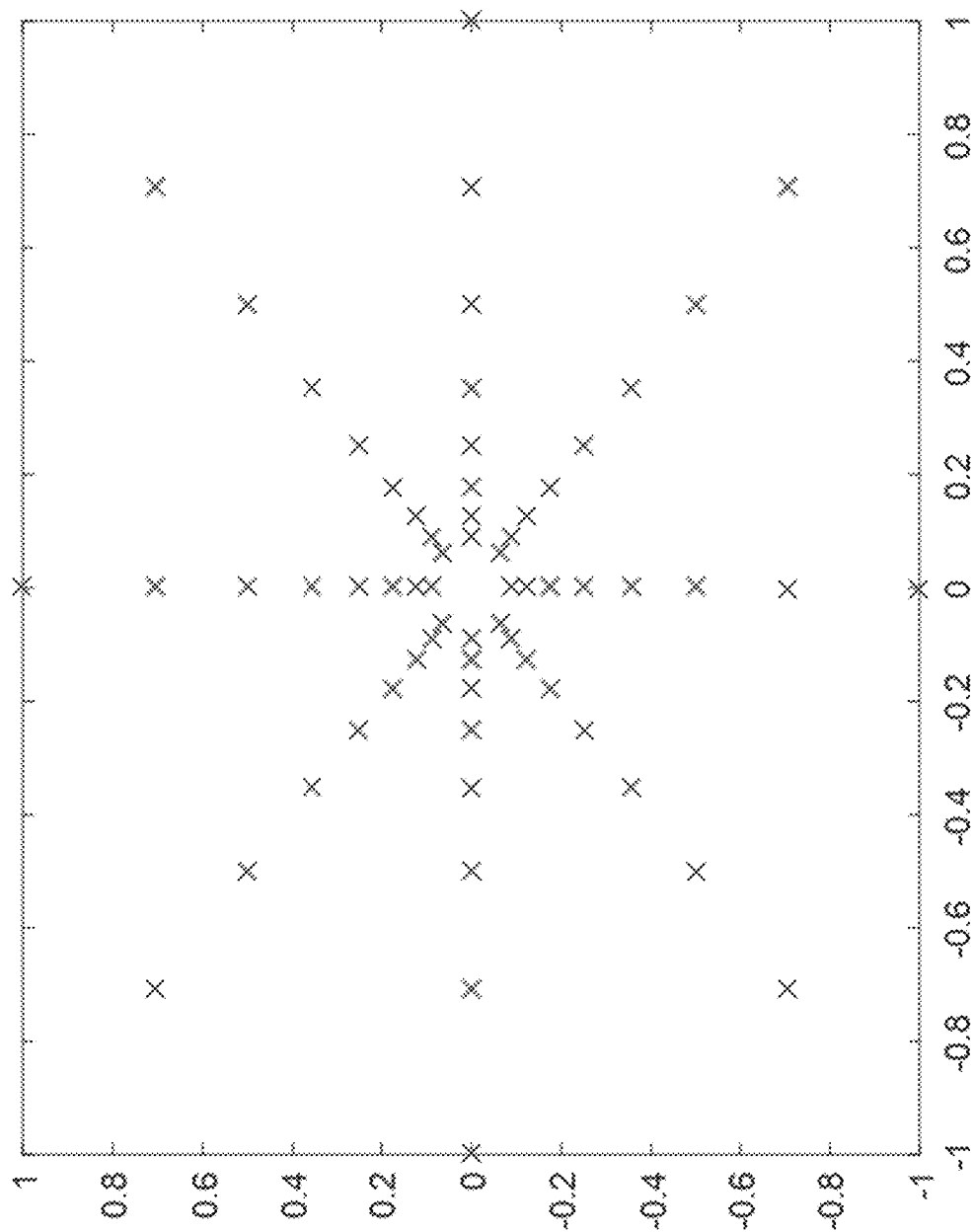
FIG. 8 is a diagram illustrating quantization constellation used in Type II CSI in one configuration.

FIG. 8 is a diagram 800 illustrating quantization constellation used in Type II CSI in one configuration. The amplitude levels of constellation arranged in the descending order follow $$\left[1, \sqrt{\frac{1}{2}}, \sqrt{\frac{1}{4}}, \sqrt{\frac{1}{8}}, \ldots, \sqrt{\frac{1}{128}}\right].$$

The phase angles of constellations follow $$\left[0, \frac{2\pi}{8}, \frac{2\pi}{8} \times 2, \ldots, \frac{2\pi}{8} \times 7\right],$$

and the phase angles can be also called "phase alphabet." In general, a quantization constellation can be given by $Ae^{j\theta}$ where A is an amplitude level, $\theta$ is a phase angle from the phase alphabet; the quantization constellation can be equivalently given by its coordinate: $Ae^{j\theta}=x+yl=(x, y)$. In Rel-15, due to the fact all the constellations lie on radial lines going through the origin point, i.e. a single phase alphabet is used for all amplitude levels, the Voronoi regions with constellations at large amplitude levels can be rather big, which result in large quantization errors.

For X-PSK, the phase range in $[0\ 2\pi)$ are divided into X equal partitions, and the start position of each partition is used as a value, e.g.

$$\left[0, \frac{2\pi}{X}, \frac{2\pi}{X} \times 2, \ldots, \frac{2\pi}{X} \times (X-1)\right].$$

X-PSK may include 32PSK, 16PSK, 12PSK, 8PSK, 6PSK and 4PSK can be considered.

In another configuration, the constellations can be rotated at some amplitude levels by a certain angle/angles to achieve Voronoi regions of more even sizes, which results in small quantization errors. In another word, more than one phase alphabet is used, and the used phase alphabet can depend on the amplitude level. Formulated in yet another way, the phase alphabet at an amplitude level can be derived from a reference phase alphabet by adding an angular shift, and the angular shift can be zero or assigned a value, e.g. depending on the amplitude level index, amplitude level values. For example, constellations' amplitude levels can be divided into two or more interlaces. If divided into two interlaces, one interlace is for amplitude levels with even indices, e.g. $\left[1, \sqrt{\frac{1}{2^2}}, \sqrt{\frac{1}{2^4}}, \sqrt{\frac{1}{2^6}}\right]$ ("even interlace" in the following); another interlace is for amplitude levels with odd indices e.g. $\left[\sqrt{\frac{1}{2^1}}, \sqrt{\frac{1}{2^3}}, \sqrt{\frac{1}{2^5}}, \sqrt{\frac{1}{2^7}}\right]$ ("odd interlace" in the following).

The phase quantization alphabet for the even interlace can be $$\left[0, \frac{2\pi}{8}, \frac{2\pi}{8} \times 2, \ldots, \frac{2\pi}{8} \times 7\right];$$

the phase quantization alphabet for the odd interlace can be a rotated version of $$\left[0, \frac{2\pi}{8}, \frac{2\pi}{8} \times 2, \ldots, \frac{2\pi}{8} \times 7\right],$$

with the same alphabet size (size X) is used for two adjacent amplitude levels $$\left(\text{say } \sqrt{\frac{1}{2}} \text{ and } \sqrt{\frac{1}{4}}\right),$$

the angular shift can be $$\frac{2\pi}{2X};$$

so a rotated version of $$\left[0, \frac{2\pi}{8}, \frac{2\pi}{8} \times 2, \ldots, \frac{2\pi}{8} \times 7\right]$$

is given by $$\left[0+\frac{2\pi}{16}, \frac{2\pi}{8}+\frac{2\pi}{16}, \frac{2\pi}{8} \times 2+\frac{2\pi}{16}, \ldots, \frac{2\pi}{8} \times 7+\frac{2\pi}{16}\right]$$

Figure 9:
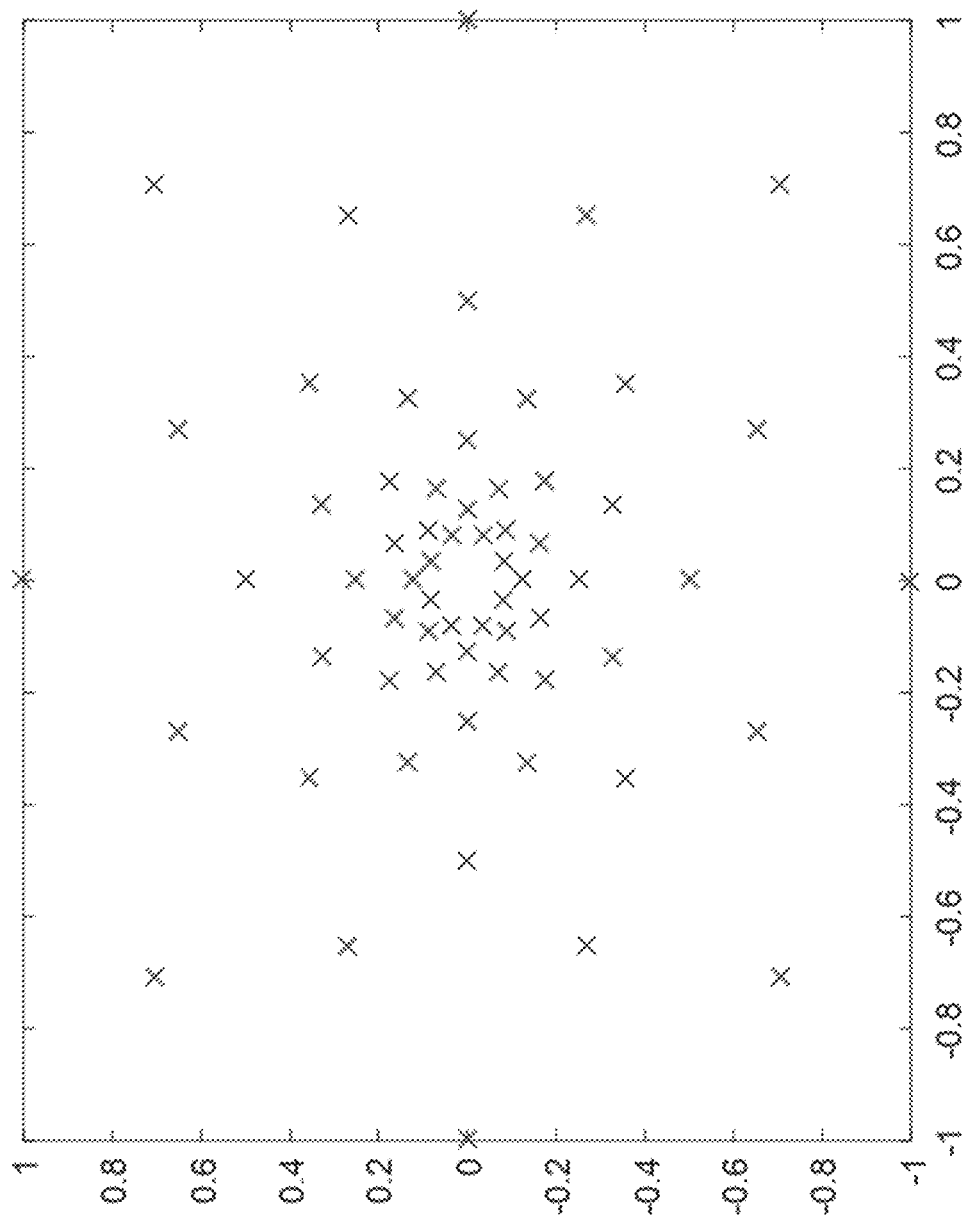
FIG. 9 is diagram illustrating the rotated constellations at all amplitude levels.

FIG. 9 is diagram 900 illustrating the rotated constellations at all amplitude levels. As shown, the constellations in FIG. 9 are more evenly spaced than those in FIG. 8. Further, the phase alphabet size may be different at different amplitude levels. Some or all of 32PSK, 16PSK, 12PSK, 8PSK, 6PSK, 4PSK can be used for amplitude levels. At small amplitude levels, 8PSK or 4PSK may be used, at large amplitude levels, 16PSK/12PSK/8PSK is/are used. In one example, there are 9 amplitude levels, $$\left[1, \sqrt{\frac{1}{2}}, \sqrt{\frac{1}{4}}, \sqrt{\frac{1}{8}}, \ldots, \sqrt{\frac{1}{128}}, \sqrt{\frac{1}{256}}\right],$$

the first 7 levels are with 16PSK, and the $8^{th}$, $9^{th}$ levels are with 8PSK, phase rotation can be applied to 16PSK/8PSK for some amplitude levels.

When all the selected coefficients are normalized, the strongest coefficient becomes "(1,0)" ((x,y)=x+y*I is the coordinates of the coefficient in the I-Q plane). In this case, it is unlikely any other coefficients would be quantized at the amplitude level of "1". In this case, the phase alphabet size at amplitude level "1" can be small, e.g., 1.

When a selected coefficient is close to "0", then there may not need to signal the phase value for the quantized coefficient, as it takes the value "(0,0)". In other words, the phase alphabet size at amplitude level "0" is 1. Of course, it can be also reasoned that indicating "0" for any selected coefficient is not necessary, in this case then there is no constellation in the quantizer at coordinate (0,0).

In certain circumstances, the phase alphabet size at amplitude levels "1" and "0" are small (e.g., the size is 1 or 0). The phase alphabet size may be reduced with the smallest non-zero amplitude level to leave one or two code states for the quantized coefficient "(1,0)" and "(0,0)" (or "(1,0)" only as discussed above).

To achieve good performance, it is desirable to have (X−1)-PSK, or (X−2)-PSK for the smallest non-zero amplitude level, to leave one or two code states for "(1,0)" and "(0,0)". However, implementation with 7-PSK may not be desirable, hence in this case it may be still possible to retain X-PSK for the smallest non-zero amplitude level, and just exclude phase angles at 0 or π, which results in a phase alphabet $$\left[\frac{2\pi}{8}, \frac{2\pi}{8}\times 2, \frac{2\pi}{8}\times 3, \frac{2\pi}{8}\times 5, \frac{2\pi}{8}\times 6, \frac{2\pi}{8}\times 7\right].$$

The quantization schemes for coefficients residing on different delay taps (or FD components) may be different. The differences may include any or all aspects as discussed here and in the previous report, including amplitude levels and/or phase alphabets and/or phase rotations, including code states for "(1,0)" and/or "(0,0)".

Conventionally, the quantized result for a coefficient takes an integer number of bits, hence the number of code states for a quantizer is limited to the power of 2, such as 32 or 64. It is found from simulation evaluations, that often including "(0,0)" leads to much better performance.

The importance of inclusion of (0,0) lies in the fact that including (0,0) has the effect to slash the smallest quantization error by half through providing the quantization constellation (0,0) in the middle of constellations of the smallest non-zero amplitude level. However, including "(0, 0)" can lead to the number of code states to be not a power of 2, e.g. with 8 amplitude levels and 8PSK, then 8×8+1=65 code states are needed. Hence, we can consider the joint encoding of several coefficients to amortize the overhead due to including more code states.

Let there be $M_c$ code states with a quantizer, the selected coefficients are divided into groups, in each group there are J coefficients; and every J coefficients are jointly signaled then it is enough to signal $s_1+s_2 M_c+s_3 M_c^2+ \ldots s_J M_c^{J-1}$, where $s_k$, $0 \le s_k \le M_c-1$, is the code state of the k-th coefficient in a group. In one example, $M_c$=80, J=3, then 19 bits can be used to signal 3 coefficients jointly. Note this technique can be used also to expand the constellation size for a quantizer in general, e.g. 16PSK for the highest amplitude level.

Through analyzing the Voronoi region among quantization constellations lying on two neighboring amplitude levels, it is found amplitude level difference other 3 dB may actually be preferred.

To reduce the quantization error for large coefficients, it can be also desirable to shift the amplitude levels by a certain amount, for example by 1.5 dB: so the amplitude levels as follows are obtained:

$$\left[1, \sqrt{\frac{\sqrt{2}}{2}}, \sqrt{\frac{\sqrt{2}}{4}}, \sqrt{\frac{\sqrt{2}}{8}}, \ldots, \sqrt{\frac{\sqrt{2}}{128}}\right]$$

Figure 10:
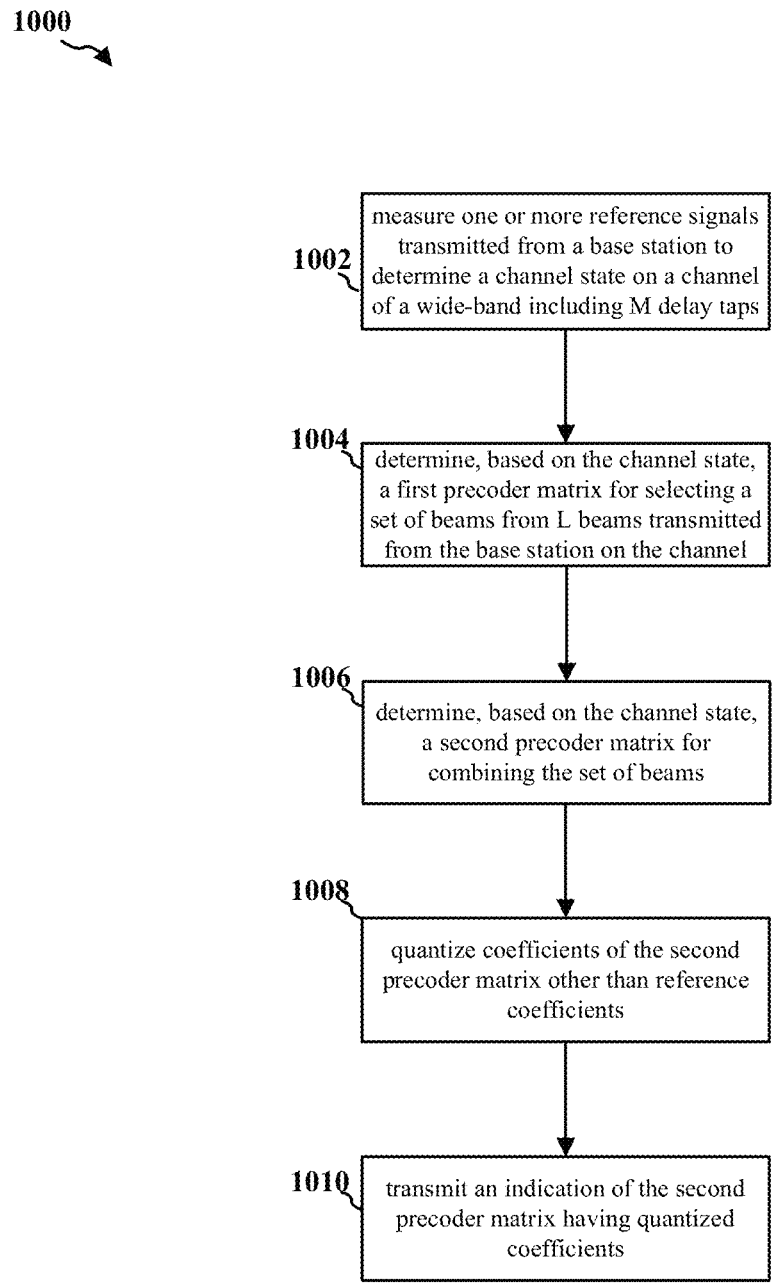
FIG. 10 is a flow chart of a method (process) for quantizing a precoder matrix.

FIG. 10 is a flow chart 1000 of a method (process) for quantizing a precoder matrix. The method may be performed by a first UE (e.g., the UE 704, the apparatus 1102, and the apparatus 1102').

At operation 1002, the UE measures one or more reference signals transmitted from a base station to determine a channel state on a channel of a wide-band including M delay taps. M is an integer greater than 1. At operation 1004, the UE determines, based on the channel state, a first precoder matrix for selecting a set of beams from L beams transmitted from the base station on the channel. L is an integer greater than 1. At operation 1006, the UE determines, based on the channel state, a second precoder matrix for combining the set of beams, the second precoder matrix including at least two groups of coefficients. Each group includes coefficients being normalized based on a respective reference coefficient selected from the each group. Each coefficient in the at least two groups of coefficients corresponds to a respective one beam of the L beams at a particular polarization on a respective one delay tap of the M delay taps. At operation 1008, the UE quantizes coefficients of the second precoder matrix other than reference coefficients. At operation 1010, the UE transmits an indication of the second precoder matrix having quantized coefficients.

In certain configurations, each of the L beams is at a first polarization and a second polarization. The at least two groups of coefficients are a first group and a second group. The first group includes coefficients correspond to the L beams at the first polarization on the M delay taps. The second group includes coefficients correspond to the L beams at the second polarization on the M sub-bands.

In certain configurations, the respective reference coefficient of each group of the at least two groups of coefficients is a coefficient having the largest amplitude in the each group. In certain configurations, a quantized coefficient has a quantized amplitude and a quantized phase.

In certain configurations, the at least two groups of coefficients include a first group and a second group. Coefficients in the first group correspond to P1 beams of the L beams on S1 delay taps of the M delay taps. Each of P1 and S1 is an integer. In certain configurations, coefficients in the second group correspond to P2 beams of the L beams on S2 delay taps of the M delay taps, P2 and S2 each being an integer.

In certain configurations, P1 is L and P2 is L. In certain configurations, a sum of S1 and S2 is M. In certain configurations, S1 is a smallest integer that is equal to or greater than M/2. The S1 delay taps are initial consecutive delay taps of the M delay taps. In certain configurations, S1 is a largest integer that is equal to or smaller than M/2, where the S1 delay taps are initial consecutive delay taps of the M delay taps.

In certain configurations, each of the L beams is at a first polarization and a second polarization. The at least two groups of coefficients include a first plurality of groups and a second plurality of groups. The coefficients in each group of the first plurality of groups correspond to the L beams at the first polarization on a respective subset of the M delay taps. The coefficients in each group of the second plurality of groups correspond to the L beams at the second polarization on a respective subset of the M delay taps.

Figure 11:
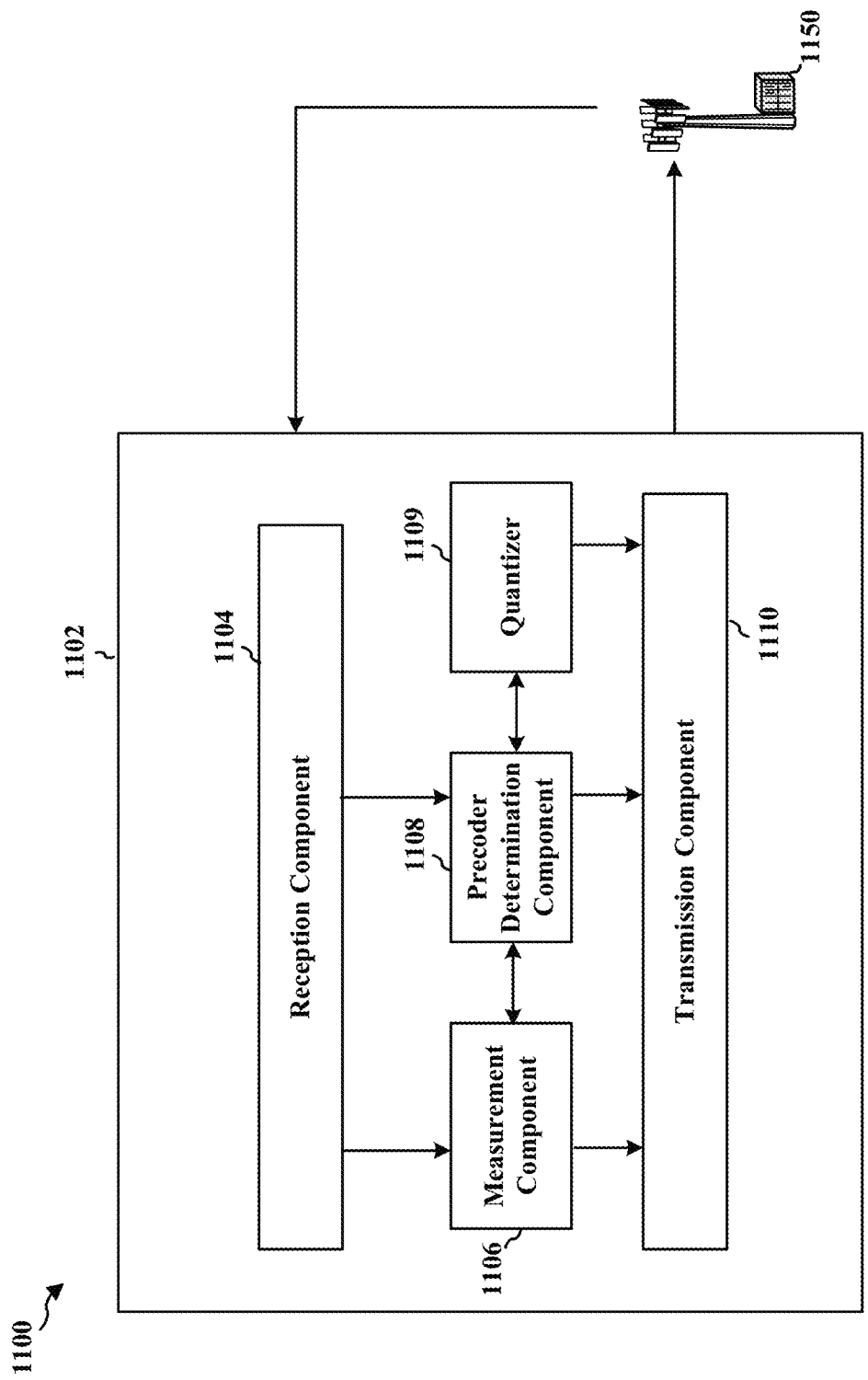
FIG. 11 is a conceptual data flow diagram illustrating the data flow between different components/means in an exemplary apparatus.

FIG. 11 is a conceptual data flow diagram 1100 illustrating the data flow between different components/means in an exemplary apparatus 1102. The apparatus 1102 may be a UE. The apparatus 1102 includes a reception component 1104, a measurement component 1106, a precoder determination component 1108, a quantizer 1109, and a transmission component 1110.

The measurement component 1106 measures one or more reference signals received at the reception component 1104 and transmitted from a base station 1150 to determine a channel state on a channel of a wide-band including M delay taps. M is an integer greater than 1. The precoder determination component 1108 determines, based on the channel state, a first precoder matrix for selecting a set of beams from L beams transmitted from the base station on the channel. L is an integer greater than 1. The precoder determination component 1108 determines, based on the channel state, a second precoder matrix for combining the set of beams, the second precoder matrix including at least two groups of coefficients. Each group includes coefficients being normalized based on a respective reference coefficient selected from the each group. Each coefficient in the at least two groups of coefficients corresponds to a respective one beam of the L beams at a particular polarization on a respective one delay tap of the M delay taps. The quantizer 1109 quantizes coefficients of the second precoder matrix other than reference coefficients. The transmission component 1110 transmits an indication of the second precoder matrix having quantized coefficients.

In certain configurations, each of the L beams is at a first polarization and a second polarization. The at least two groups of coefficients are a first group and a second group. The first group includes coefficients correspond to the L beams at the first polarization on the M delay taps. The second group includes coefficients correspond to the L beams at the second polarization on the M sub-bands.

In certain configurations, the respective reference coefficient of each group of the at least two groups of coefficients is a coefficient having the largest amplitude in the each group. In certain configurations, a quantized coefficient has a quantized amplitude and a quantized phase.

In certain configurations, the at least two groups of coefficients include a first group and a second group. Coefficients in the first group correspond to P1 beams of the L beams on S1 delay taps of the M delay taps. Each of P1 and S1 is an integer. In certain configurations, coefficients in the second group correspond to P2 beams of the L beams on S2 delay taps of the M delay taps, P2 and S2 each being an integer.

In certain configurations, P1 is L and P2 is L. In certain configurations, a sum of S1 and S2 is M. In certain configurations, S1 is a smallest integer that is equal to or greater than M/2. The S1 delay taps are initial consecutive delay taps of the M delay taps. In certain configurations, S1 is a largest integer that is equal to or smaller than M/2, where the S1 delay taps are initial consecutive delay taps of the M delay taps.

In certain configurations, each of the L beams is at a first polarization and a second polarization. The at least two groups of coefficients include a first plurality of groups and a second plurality of groups. The coefficients in each group of the first plurality of groups correspond to the L beams at the first polarization on a respective subset of the M delay taps. The coefficients in each group of the second plurality of groups correspond to the L beams at the second polarization on a respective subset of the M delay taps.

Figure 12:
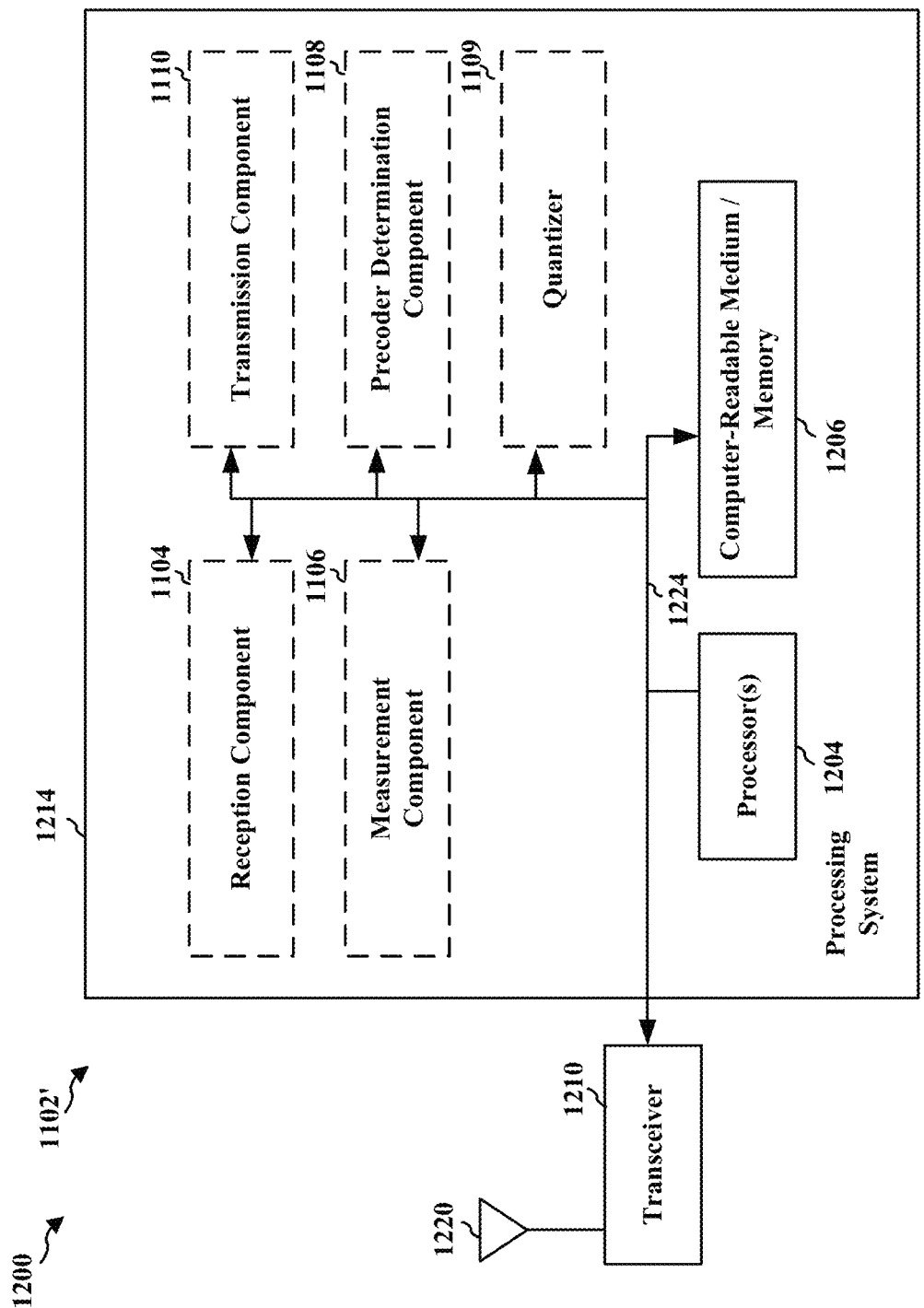
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The apparatus 1102' may be a UE. The processing system 1214 may be implemented with a bus architecture, represented generally by a bus 1224. The bus 1224 may include any number of interconnecting buses and bridges depending on the specific application of the processing system 1214 and the overall design constraints. The bus 1224 links together various circuits including one or more processors and/or hardware components, represented by one or more processors 1204, the reception component 1104, the measurement component 1106, the precoder determination component 1108, the quantizer 1109, the transmission component 1110, and a computer-readable medium/memory 1206. The bus 1224 may also link various other circuits such as timing sources, peripherals, voltage regulators, and power management circuits, etc.

The processing system 1214 may be coupled to a transceiver 1210, which may be one or more of the transceivers 354. The transceiver 1210 is coupled to one or more antennas 1220, which may be the communication antennas 352.

The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1110, and based on the received information, generates a signal to be applied to the one or more antennas 1220.

The processing system 1214 includes one or more processors 1204 coupled to a computer-readable medium/memory 1206. The one or more processors 1204 are responsible for general processing, including the execution of software stored on the computer-readable medium/memory 1206. The software, when executed by the one or more processors 1204, causes the processing system 1214 to perform the various functions described supra for any particular apparatus. The computer-readable medium/memory 1206 may also be used for storing data that is manipulated by the one or more processors 1204 when executing software. The processing system 1214 further includes at least one of the reception component 1104, the measurement component 1106, the precoder determination component 1108, the quantizer 1109, and the transmission component 1110. The components may be software components running in the one or more processors 1204, resident/stored in the computer readable medium/memory 1206, one or more hardware components coupled to the one or more processors 1204, or some combination thereof. The processing system 1214 may be a component of the UE 350 and may include the memory 360 and/or at least one of the TX processor 368, the RX processor 356, and the communication processor 359.

In one configuration, the apparatus 1102/apparatus 1102' for wireless communication includes means for performing each of the operations of FIG. 10. The aforementioned means may be one or more of the aforementioned components of the apparatus 1102 and/or the processing system 1214 of the apparatus 1102' configured to perform the functions recited by the aforementioned means.

As described supra, the processing system 1214 may include the TX Processor 368, the RX Processor 356, and the communication processor 359. As such, in one configuration, the aforementioned means may be the TX Processor 368, the RX Processor 356, and the communication processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
    measuring one or more reference signals transmitted from a base station to determine a channel state on a channel of a wide-band including M delay taps, M being an integer greater than 1;
    determining, based on the channel state, a first precoder matrix for selecting a set of beams from L beams transmitted from the base station on the channel, L being an integer greater than 1;
    determining, based on the channel state, a second precoder matrix for combining the set of beams, the second precoder matrix including at least two groups of coefficients, each group including coefficients being normalized based on a respective reference coefficient selected from the each group, each coefficient in the at least two groups of coefficients corresponding to a respective one beam of the L beams at a particular polarization on a respective one delay tap of the M delay taps;
    quantizing coefficients of the second precoder matrix other than reference coefficients; and
    transmitting an indication of the second precoder matrix having quantized coefficients.

2. The method of claim 1, wherein each of the L beams is at a first polarization and a second polarization, wherein the at least two groups of coefficients are a first group and a second group, wherein the first group includes coefficients correspond to the L beams at the first polarization on the M delay taps, wherein the second group includes coefficients correspond to the L beams at the second polarization on the M delay taps.

3. The method of claim 1, wherein the respective reference coefficient of each group of the at least two groups of coefficients is a coefficient having the largest amplitude in the each group.

4. The method of claim 1, wherein a quantized coefficient has a quantized amplitude and a quantized phase.

5. The method of claim 1, wherein the at least two groups of coefficients include a first group and a second group, wherein coefficients in the first group correspond to P1 beams of the L beams on S1 delay taps of the M delay taps, P1 and S1 each being an integer, wherein coefficients in the second group correspond to P2 beams of the L beams on S2 delay taps of the M delay taps, P2 and S2 each being an integer.

6. The method of claim 5, wherein P1 is L and P2 is L, wherein a sum of S1 and S2 is M.

7. The method of claim 5, wherein S1 is a smallest integer that is equal to or greater than M/2, where the S1 delay taps are initial consecutive delay taps of the M delay taps.

8. The method of claim 5, wherein S1 is a largest integer that is equal to or smaller than M/2, where the S1 delay taps are initial consecutive delay taps of the M delay taps.

9. The method of claim 1, wherein each of the L beams is at a first polarization and a second polarization, wherein the at least two groups of coefficients include a first plurality of groups and a second plurality of groups, wherein the coefficients in each group of the first plurality of groups correspond to the L beams at the first polarization on a respective subset of the M delay taps, wherein the coefficients in each group of the second plurality of groups correspond to the L beams at the second polarization on a respective subset of the M delay taps.

10. An apparatus for wireless communication, the apparatus being a user equipment (UE), comprising:
    a memory; and
    at least one processor coupled to the memory and configured to:
    measure one or more reference signals transmitted from a base station to determine a channel state on a channel of a wide-band including M delay taps, M being an integer greater than 1;
    determine, based on the channel state, a first precoder matrix for selecting a set of beams from L beams transmitted from the base station on the channel, L being an integer greater than 1;

determine, based on the channel state, a second precoder matrix for combining the set of beams, the second precoder matrix including at least two groups of coefficients, each group including coefficients being normalized based on a respective reference coefficient selected from the each group, each coefficient in the at least two groups of coefficients corresponding to a respective one beam of the L beams at a particular polarization on a respective one delay tap of the M delay taps;

quantize coefficients of the second precoder matrix other than reference coefficients; and transmit an indication of the second precoder matrix having quantized coefficients.

11. The apparatus of claim 10, wherein each of the L beams is at a first polarization and a second polarization, wherein the at least two groups of coefficients are a first group and a second group, wherein the first group includes coefficients correspond to the L beams at the first polarization on the M delay taps, wherein the second group includes coefficients correspond to the L beams at the second polarization on the M sub-bands.

12. The apparatus of claim 10, wherein the respective reference coefficient of each group of the at least two groups of coefficients is a coefficient having the largest amplitude in the each group.

13. The apparatus of claim 10, wherein a quantized coefficient has a quantized amplitude and a quantized phase.

14. The apparatus of claim 10, wherein the at least two groups of coefficients include a first group and a second group, wherein coefficients in the first group correspond to P1 beams of the L beams on S1 delay taps of the M delay taps, P1 and S1 each being an integer, wherein coefficients in the second group correspond to P2 beams of the L beams on S2 delay taps of the M delay taps, P2 and S2 each being an integer.

15. The apparatus of claim 14, wherein P1 is L and P2 is L, wherein a sum of S1 and S2 is M.

16. The apparatus of claim 14, wherein S1 is a smallest integer that is equal to or greater than M/2, wherein the S1 delay taps are initial consecutive delay taps of the M delay taps.

17. The apparatus of claim 14, wherein S1 is a largest integer that is equal to or smaller than M/2, wherein the S1 delay taps are initial consecutive delay taps of the M delay taps.

18. The apparatus of claim 10, wherein each of the L beams is at a first polarization and a second polarization, wherein the at least two groups of coefficients include a first plurality of groups and a second plurality of groups, wherein the coefficients in each group of the first plurality of groups correspond to the L beams at the first polarization on a respective subset of the M delay taps, wherein the coefficients in each group of the second plurality of groups correspond to the L beams at the second polarization on a respective subset of the M delay taps.

19. A non-transitory computer-readable medium storing computer executable code for wireless communication of a user equipment (UE), comprising code to:

measure one or more reference signals transmitted from a base station to determine a channel state on a channel of a wide-band including M delay taps, M being an integer greater than 1;

determine, based on the channel state, a first precoder matrix for selecting a set of beams from L beams transmitted from the base station on the channel, L being an integer greater than 1;

determine, based on the channel state, a second precoder matrix for combining the set of beams, the second precoder matrix including at least two groups of coefficients, each group including coefficients being normalized based on a respective reference coefficient selected from the each group, each coefficient in the at least two groups of coefficients corresponding to a respective one beam of the L beams at a particular polarization on a respective one delay tap of the M delay taps;

quantize coefficients of the second precoder matrix other than reference coefficients; and transmit an indication of the second precoder matrix having quantized coefficients.

20. The non-transitory computer-readable medium of claim 19, wherein each of the L beams is at a first polarization and a second polarization, wherein the at least two groups of coefficients are a first group and a second group, wherein the first group includes coefficients correspond to the L beams at the first polarization on the M delay taps, wherein the second group includes coefficients correspond to the L beams at the second polarization on the M sub-bands.

* * * * *